US007640821B2

United States Patent
Lee et al.

(10) Patent No.: US 7,640,821 B2
(45) Date of Patent: Jan. 5, 2010

(54) CIRCULATING MEMBER FOR A BALL SCREW

(75) Inventors: Yu-Shan Lee, Taichung (TW); Kenny Lin, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 354 days.

(21) Appl. No.: 11/619,570

(22) Filed: Jan. 3, 2007

(65) Prior Publication Data

US 2008/0156131 A1    Jul. 3, 2008

(51) Int. Cl.
F16H 1/24 (2006.01)
F16H 55/02 (2006.01)
(52) U.S. Cl. ............... 74/424.86; 74/424.87; 74/424.82
(58) Field of Classification Search .............. 74/424.82, 74/424.86, 424.87
See application file for complete search history.

(56) References Cited

U.S. PATENT DOCUMENTS 2,618,166 A * 11/1952 Douglas ................. 74/424.87
3,667,311 A * 6/1972 Wysong .................... 74/424.75
4,226,137 A * 10/1980 Sharp ...................... 74/424.86
5,937,700 A * 8/1999 Brown et al. .............. 74/424.86
5,988,007 A * 11/1999 Nishimura ............... 74/424.87
6,813,969 B2 * 11/2004 Huang ..................... 74/424.83
2005/0076733 A1* 4/2005 Yamamoto et al. ........ 74/424.87
2006/0196291 A1* 9/2006 Yoshioka et al. ......... 74/424.87

* cited by examiner

Primary Examiner—Thomas R Hannon
Assistant Examiner—Justin Krause
(74) Attorney, Agent, or Firm—Banger Shia

(57) ABSTRACT

A circulating member for a ball screw is disposed on a nut, the nut is formed with Gothic type threads, and the circulating member of the ball screw is formed with return path for enabling the balls to circulate. The connecting ports at both ends of the return path for connecting the threads of the nut are shaped in Gothic style, thus eliminating the level difference and consequently preventing the balls from being struck and jammed.

3 Claims, 6 Drawing Sheets

CIRCULATING MEMBER FOR A BALL SCREW

BACKGROUND OF THE INVENTION

1. Field of the Invention

The present invention relates to a component for a ball screw, and more particularly to a circulating member for a ball screw, which can eliminate the conjunction level difference and prevent the balls from being struck.

2. Description of the Prior Art

Nowadays, ball screw is used more and more widely in modern industries. As a linear transmission means, the ball screw not only has high precision but also has the advantages of low frictional loss, high energy conversion ratio, low noise and high rigidity. Hence, it is self-evident that the ball screw is very important to various industrial mechanisms.

In order for the balls between the screw and the nut to circulate smoothly and for eliminating the circulating impact force caused therebetween, the nut is usually provided at both ends thereof with a circulating member (for example, circulating cap). And the circulating member is a key member for enabling the balls circulation from the screw and the nut. Therefore, how to develop an improved and competitive circulating cap is the common goal that the manufactures are striving for.

The conventional circulating members are shown in FIGS. 1, 2 and 3.

FIGS. 2 and 3 show an ordinary conventional circulating structure, and FIG. 1 shows a circulating member disclosed in U.S. Pat. No. 2,618,166, wherein the conventional ball screw comprises: a nut 10, a screw 11, a plurality of balls 12, and a circulating member 13 installed radially from outside into inside of the ball screw. The circulating member 13 is inserted in the nut 10 via the hole 101 and serves to cooperate with the Gothic type (Gothic type or Gothic shape is a pointed arch) thread 102 to guide the balls 12. The balls 12 climb over the ridge of the threads of the screw 11 and move from one thread 102 to the other neighboring thread 102 through the return path 131 of the circulating member 13 connected between two neighboring threads 102. The two neighboring inner threads 102 of the nut 10 are connected with the return path 131 of the circulating member 13 to form an enclosed circulating path for enabling the balls to circulate endlessly. The structures shown in FIGS. 2 and 3 are the same in design, therefore, they are designated with the same reference numbers. These conventional circulating structures have the disadvantages as follows:

When the balls 12 move into the return path 131 of the circulating member 13, since the inner threads 102 of the nut 10 are of Gothic type, but the return path 131 of the circulating member 13 is a circular arc-shaped passage. Inevitably, at the conjunction between the return path 131 of the circulating member 13 and the inner threads 102 of the nut 10 appears a non-continuous level difference X and consequently the balls 12 are likely to be struck or jammed by the level difference X when moving in and out of the circulating member 13, and consequently, the balls 12 can't move smoothly.

The aforementioned circulating member 13 generally refers to a cap piece, an engaging piece, or the like, used to connect the thread for enabling the balls to circulate. The circulating path 131 is circular arc-shaped and constant in cross section. Since the circulating path 131 can't flushly abut the inner threads 102 of the nut 10, inevitably, there will exist a level difference X, and consequently, the balls will strike the level difference X.

The present invention has arisen to mitigate and/or obviate the afore-described disadvantages.

SUMMARY OF THE INVENTION

The primary objective of the present invention is to provide a circulating member for a ball screw which won't have a severe conjunction level difference.

To obtain the abovementioned objective, the circulating member for a ball screw in accordance with the present invention is disposed on a nut with Gothic type threads and is formed with a return path to be connected to the threads of the nut for enabling balls to circulate. At either end of the return path of the circulating member is formed a connecting port for connecting the threads of the nut, and the connecting port is shaped in Gothic style.

By such arrangements, level difference at the conjunction between the circulating member and the nut disappears, thus preventing the balls from being struck and jammed, reducing the operation noise.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
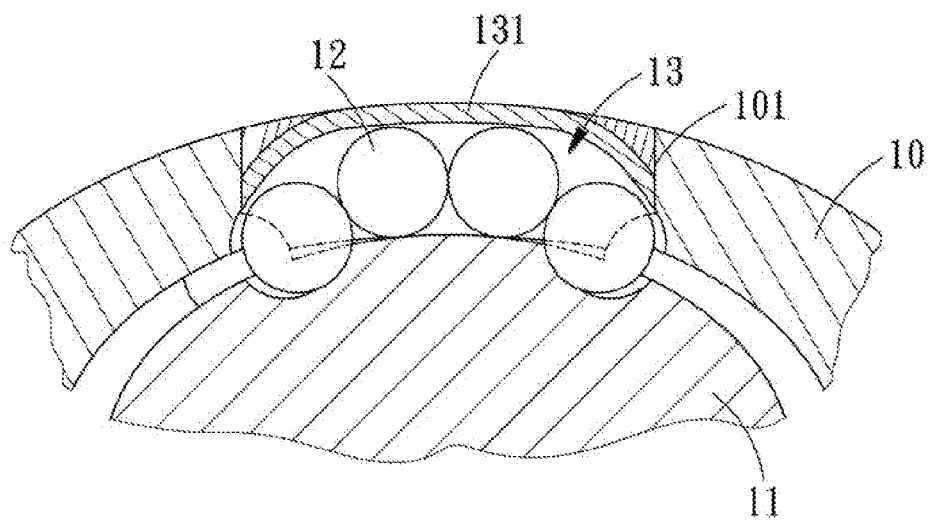
FIG. 1 is a cross sectional view of a circulating member for a ball screw disclosed in U.S. Pat. No. 2,618,166.
Figure 2:
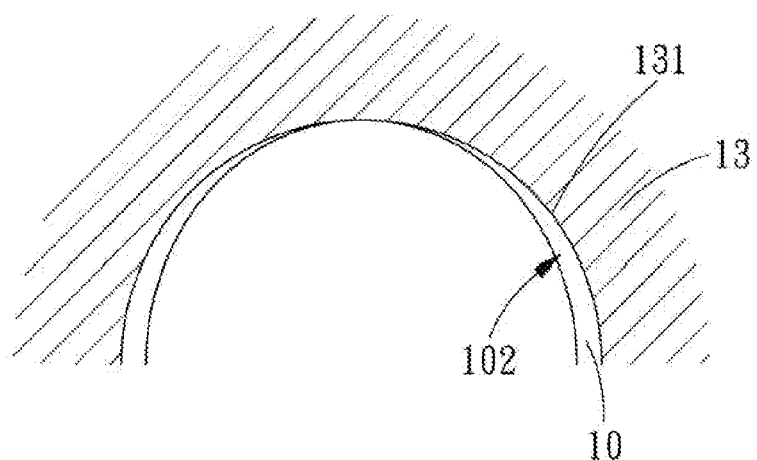
FIG. 2 is a cross sectional view of a conventional circulating member for a ball screw.
Figure 3:
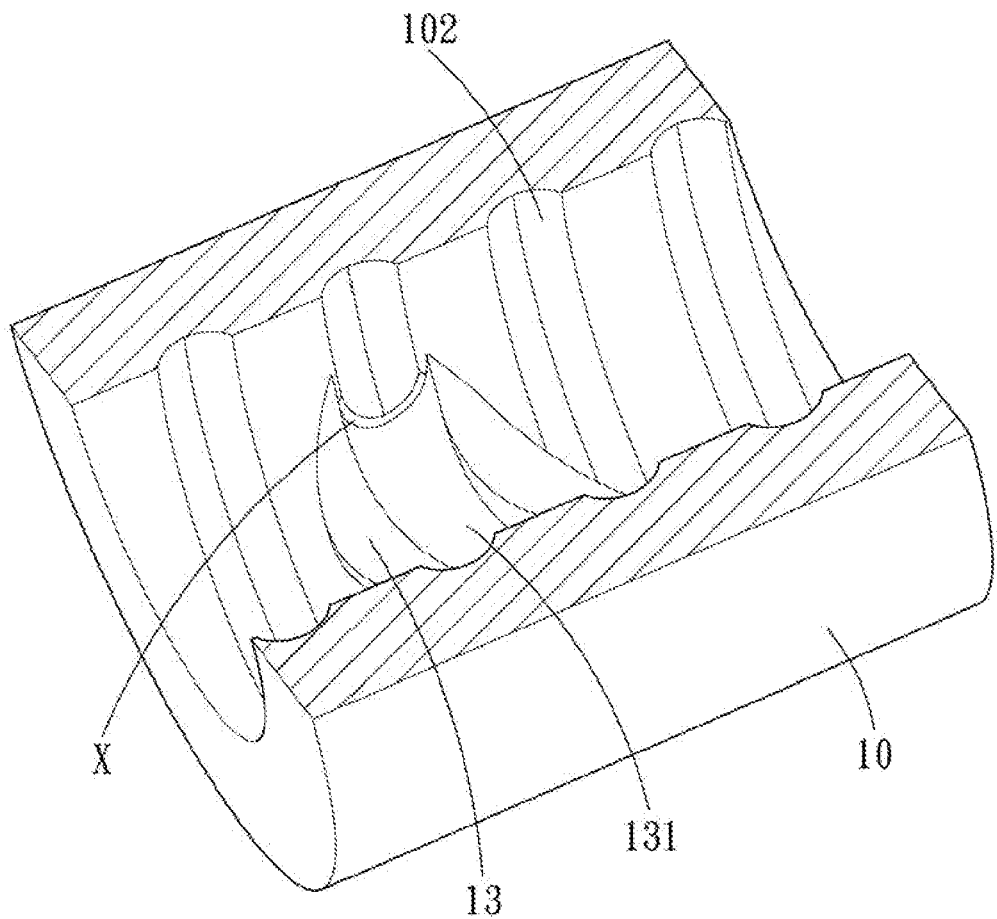
FIG. 3 is a perspective cross sectional view of showing the interior structure of a conventional circulating member for a ball screw.
Figure 4:
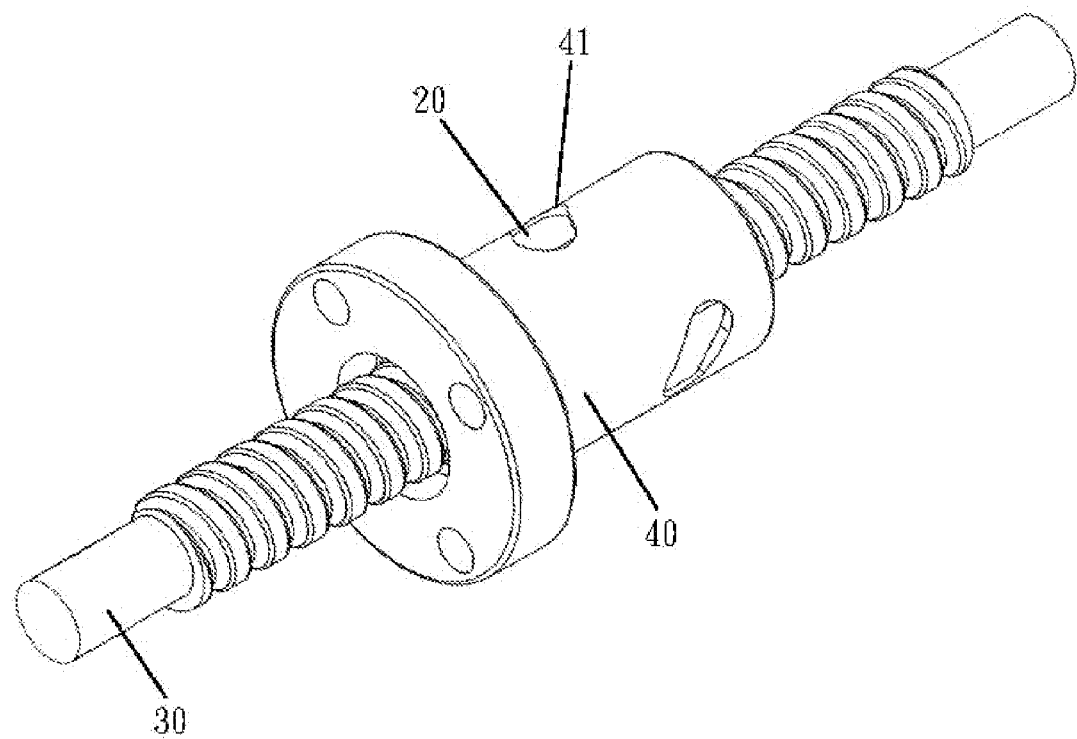
FIG. 4 is an assembly view in accordance with the present invention of showing a circulating cap is being assembled on a ball screw.
Figure 5:
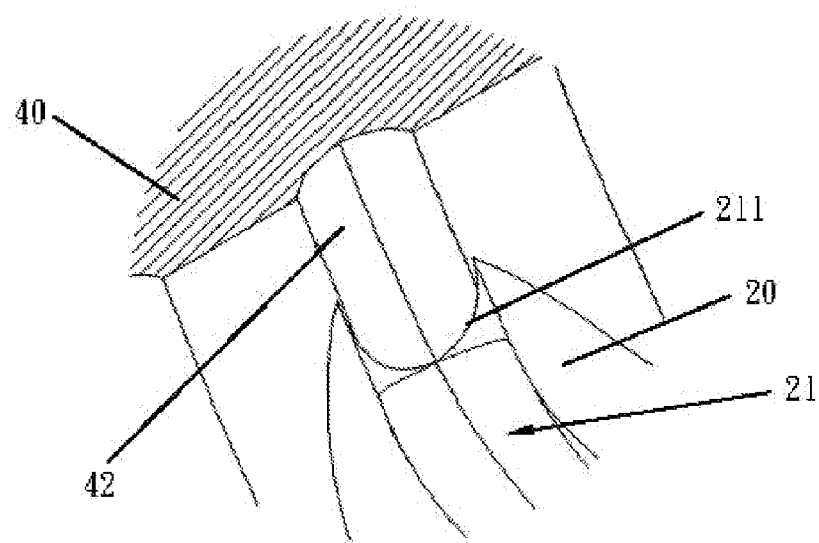
FIG. 5 is a perspective cross sectional view in accordance with the present invention of showing a part of the circulating cap and the nut.

Referring to FIGS. 4 and 5, an embodiment of the circulating member for ball screw in accordance with the present invention is a circulating cap 20, but the present invention is not limited to the circulating cap, all circulating members installed in the nut of the ball screw are considered to be within the scope of the present invention.

The circulating cap 20 is radially disposed in a through hole 41 of a nut 40, in the nut 40 are formed Gothic type threads 42 through which the nut 40 is threaded to a screw 30. The circulating cap 20 is formed with a return path 21 for connecting the threads 42 of the nut 40. The structural improvements of the present invention are described as follows:

At either end of the return path 21 of the circulating cap 20 are formed a connecting port 211 for connecting the threads 42 of the nut 40, and the connecting ports 211 are shaped in Gothic style for cooperating with the Gothic type threads 42 of the nut 40.

By such arrangements, level difference at the conjunction between the circulating member and the nut disappears, thus preventing the balls from being struck and jammed, and reducing the operation noise.

Figure 6:
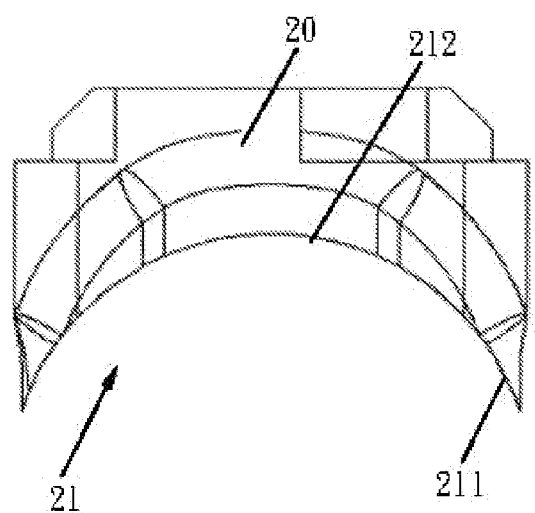
FIG. 6 is an illustrative view of a circulating member in accordance with a second embodiment of the present invention.
Figure 7:
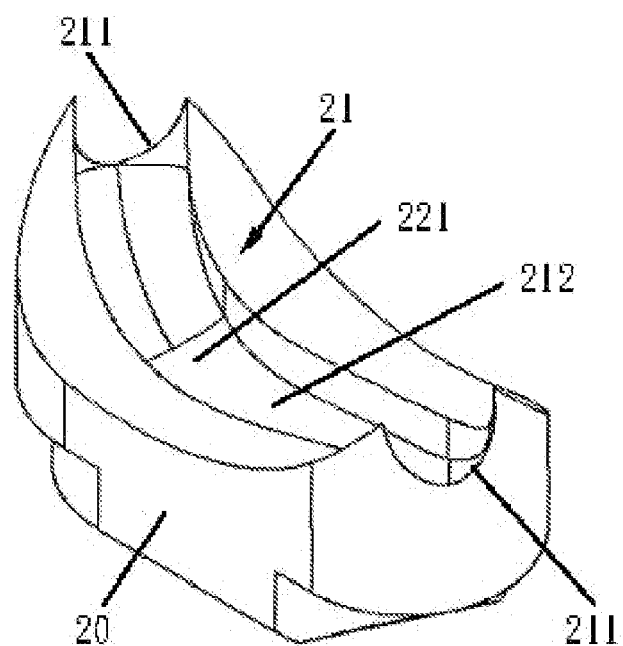
FIG. 7 is a perspective view of the circulating member in accordance with the second embodiment of the present invention.

It is to be noted that, as shown in FIGS. 6 and 7, the return path 21 of the circulating member in accordance with the present invention is circular arc-shaped and inconstant in cross section (gradually changed in cross section), between the two connecting ports 211 is a circular arc-shaped path 212 that is gradually changed toward both sides to form the Gothic type connecting port 211.

Therefore, the aforementioned connecting port is Gothic type and is constant in cross section, and the part 221 of the circulating path where the balls move upward (as shown in FIG. 7) is gradually changed into a circular arc-shaped path 212 with an inconstant cross section, and then is turned into a circular arc-shaped path 212 with a constant cross section when passing through the thread ridge. Such an embodiment enables the balls to roll more smoothly.

Figure 8:
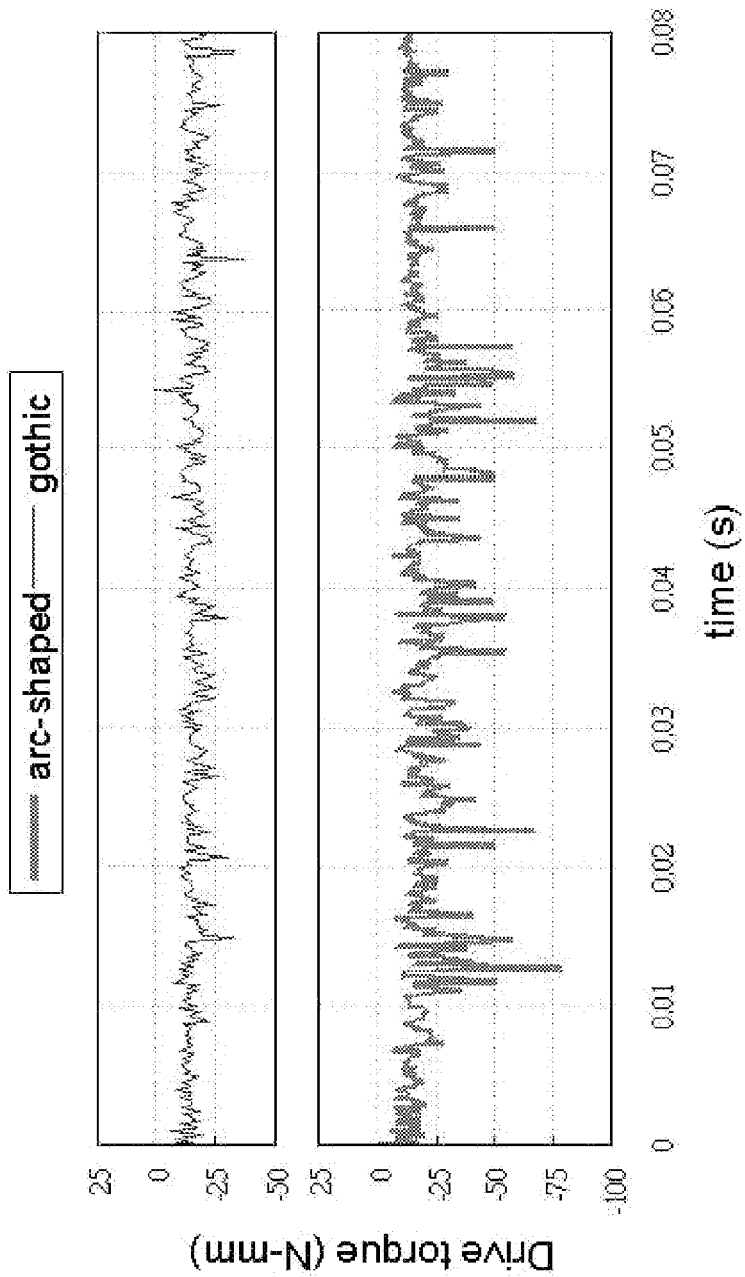
FIG. 8 shows the data comparison between the drive torque of a ball screw with the conventional arc-shaped connecting port and the drive torque of a ball screw with the Gothic connecting port of the present invention.

Finally, FIG. 8 shows the data comparison between the drive torque of a ball screw with the conventional circular arc-shaped connecting port and the drive torque of a ball screw with the Gothic connecting port of the present invention. As far as the circular arc-shaped connecting port is concerned, the drive torque of the ball screw is unstable, and its average drive torque is relatively large as compared with the Gothic type connecting port. These test data show that the structural design of the circulating path of the present invention can prevent the balls from being struck and jammed.

To summarize, the present invention is disposed on a nut, the nut is formed with Gothic type threads, and the circulating member of the ball screw is formed with return path for enabling the balls to circulate. The connecting ports at both ends of the return path for connecting the threads of the nut are shaped in Gothic style, thus eliminating the level difference and consequently preventing the balls from being struck and jammed.

While we have shown and described various embodiments in accordance with the present invention, it is clear to those skilled in the art that further embodiments may be made without departing from the scope of the present invention.

What is claimed is:

1. A circulating member for a ball screw being disposed on a nut which is provided with gothic arch threads, the circulating member is formed with a return path which is connected to the threads of the nut for enabling balls to circulate, characterized in that:
    a connecting port for connecting the threads of the nut is formed at each end of the return path of the circulating member, and the connecting port is shaped in the form of a pointed arch;
    the return path is inconstant in cross section, a middle portion of the return path is circular arch-shaped in cross section and both ends of the return path is pointed arch-shaped in cross section; and
    wherein a part of the return path where the connecting port is located is gothic arch-shaped, and a part of the circulating path is circular arc-shaped in cross section, and a part of the return path where the balls pass through a thread ridge of a thread of the screw shaft is circular arc-shaped in cross section.

2. The circulating member for a ball screw as claimed in claim 1, wherein a through hole is formed in the nut for accommodation of the circulating member of the ball screw.

3. The circulating member for a ball screw as claimed in claim 2, wherein the circulating member is a circulating cap positioned in the nut.

* * * * *